United States Patent [19]

Wodis

[11] Patent Number: 4,665,624
[45] Date of Patent: May 19, 1987

[54] CONTACT LENS ANALYZING APPARATUS

[76] Inventor: Michael Wodis, 6556 N. Northwest Hwy., Chicago, Ill. 60631

[21] Appl. No.: 673,526

[22] Filed: Nov. 20, 1984

[51] Int. Cl.$^4$ .............................................. B24B 13/00
[52] U.S. Cl. .................................... 33/507; 33/169 B; 33/613; 51/216 LP
[58] Field of Search ............. 33/507, 200, 520, 169 B, 33/180 R; 51/216 LP; 351/247

[56] References Cited

U.S. PATENT DOCUMENTS

| | | | |
|---|---|---|---|
| 3,347,088 | 10/1967 | Barnes | 33/507 |
| 3,769,714 | 11/1973 | Anderson | 33/180 R |
| 3,820,899 | 6/1974 | McCormack | 33/507 |
| 3,917,391 | 11/1975 | Padula | 33/507 |
| 3,978,620 | 9/1976 | Feneberg et al. | 51/216 LP |
| 3,994,101 | 11/1976 | Coburn et al. | 51/216 LP |
| 4,171,576 | 10/1979 | Lagorsse | 33/507 |
| 4,205,452 | 6/1980 | Wichterle | 33/507 |
| 4,212,107 | 7/1980 | Mezzasalma | 514/370 |
| 4,323,850 | 4/1982 | Dawson | 242/66 |
| 4,403,420 | 9/1983 | Rarick | 33/507 |

FOREIGN PATENT DOCUMENTS

| | | |
|---|---|---|
| 1427118 | 3/1976 | United Kingdom . |
| 1427030 | 3/1976 | United Kingdom . |
| 2056702 | 3/1981 | United Kingdom . |

OTHER PUBLICATIONS

MJA Post, Contact Lens Monthly, reprinted from the Optician, Feb. 2, 1982.
Optimec Services Ltd., Model JCF brochure.

Primary Examiner—Willis Little

[57] ABSTRACT

An apparatus for analyzing a soft contact lens by allowing inspection of the lens and measurement of its diameter, sagittal depth, and center thickness includes a lens holder comprising a handle and a lens chamber. The chamber has horizontally adjustable walls, a transparent movable lid, and a floor with a centrally located opening smaller than the diameter of a lens. The lens diameter can be read from a scale on the floor of the chamber and the walls of the chamber can then be spaced according to the measured diameter to center the lens over the opening. A probe remotely operable from outside the chamber is inserted through the opening in the chamber floor and moved vertically until its tip contacts the concave side of the lens. The sagittal depth of the lens is read from a scale associated with the probe. The probe, supporting the lens, can then be moved even further upwardly until the convex side of the lens contacts the ceiling of the chamber, as determined visually or by noting the conjunction of the lens with its reflection in the chamber lid. The center thickness is measured with another scale associated with the probe.

48 Claims, 35 Drawing Figures

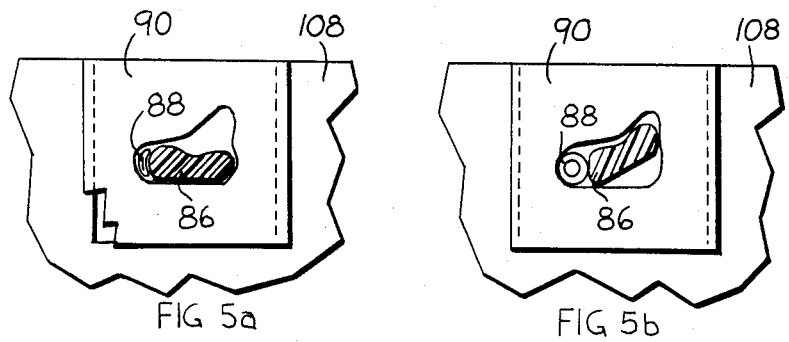
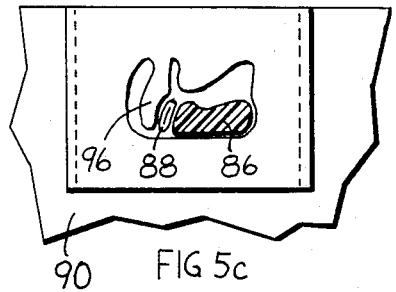
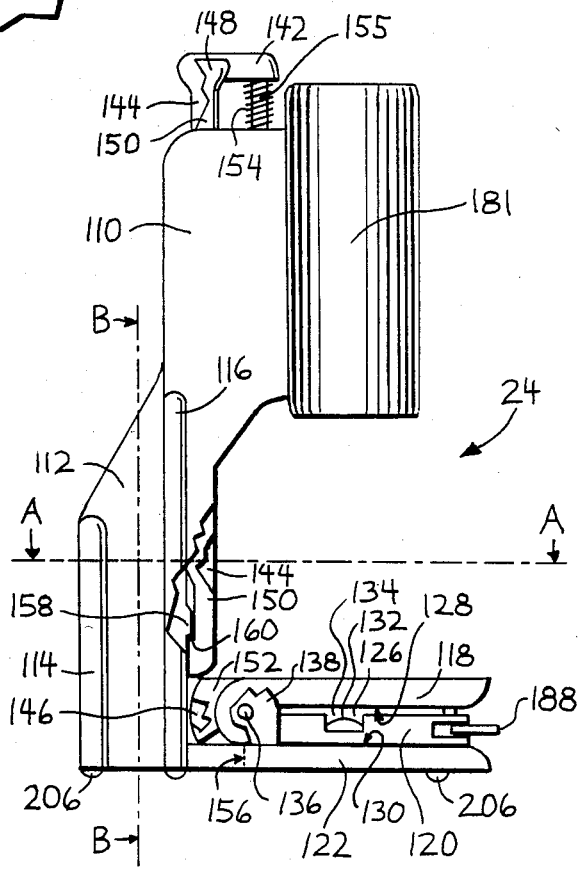

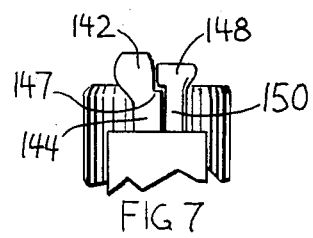
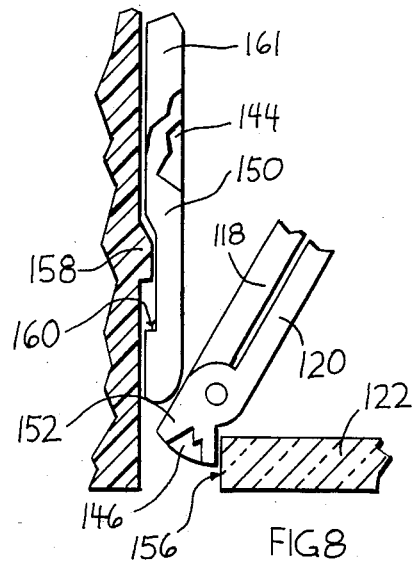
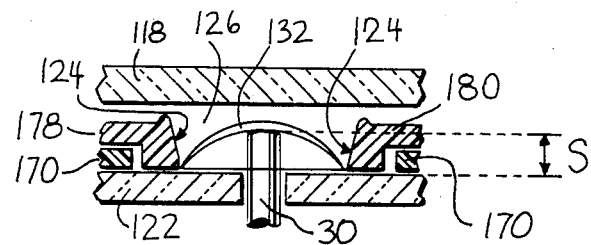
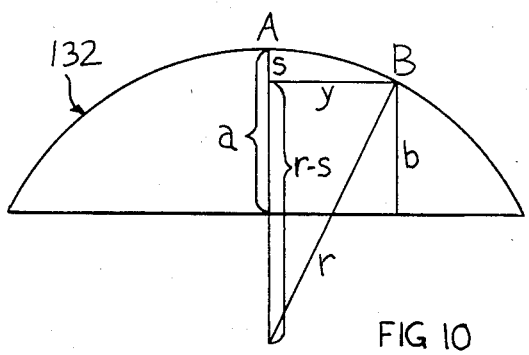

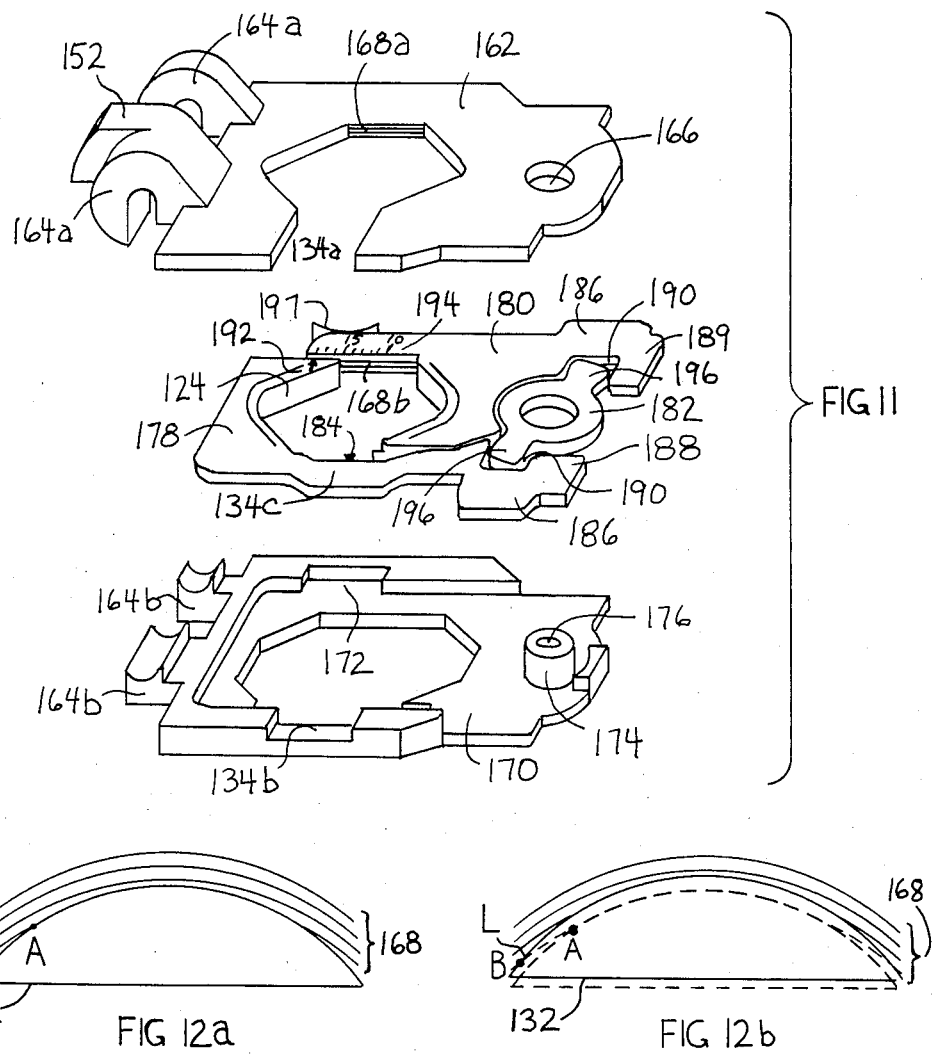

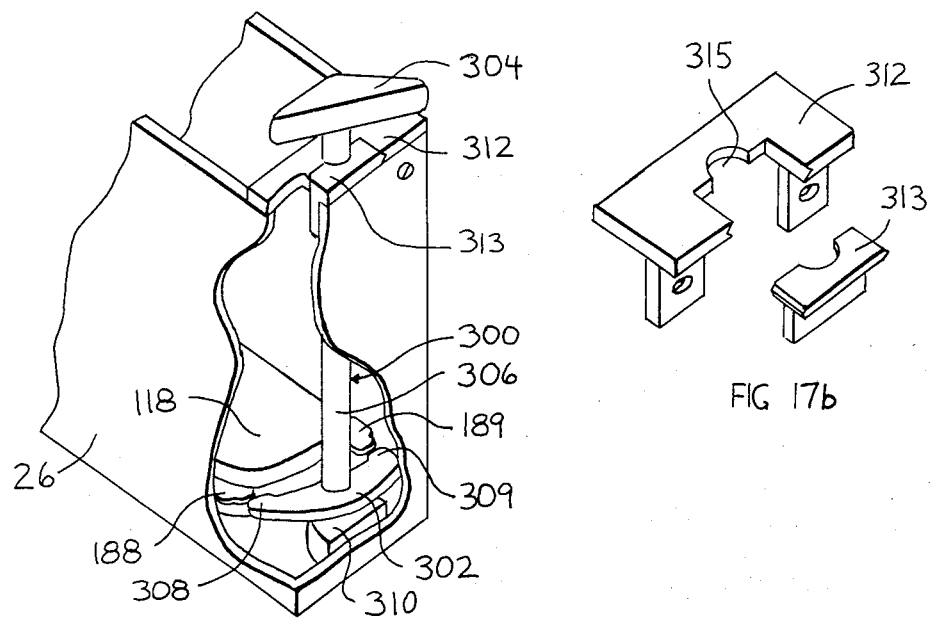
FIG 17a
FIG 17b
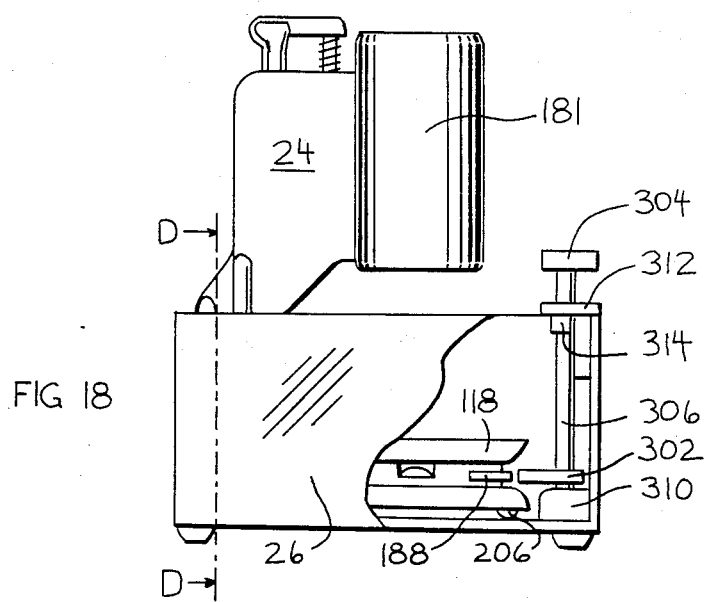
FIG 18

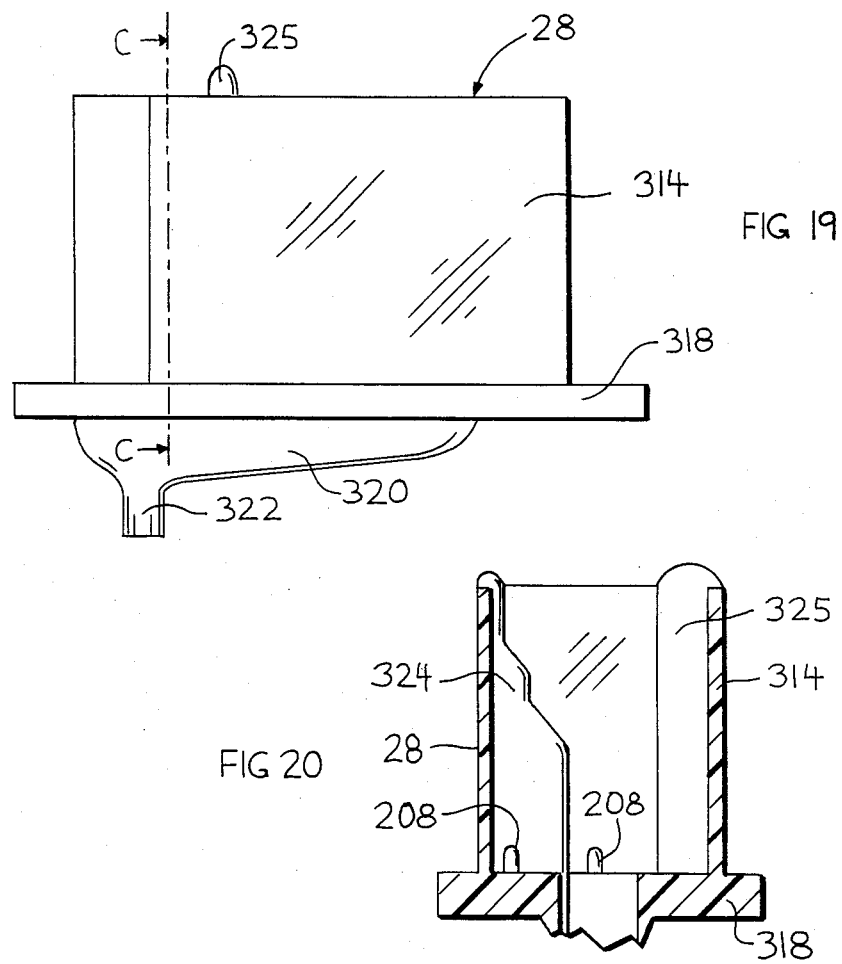
FIG 19
FIG 20
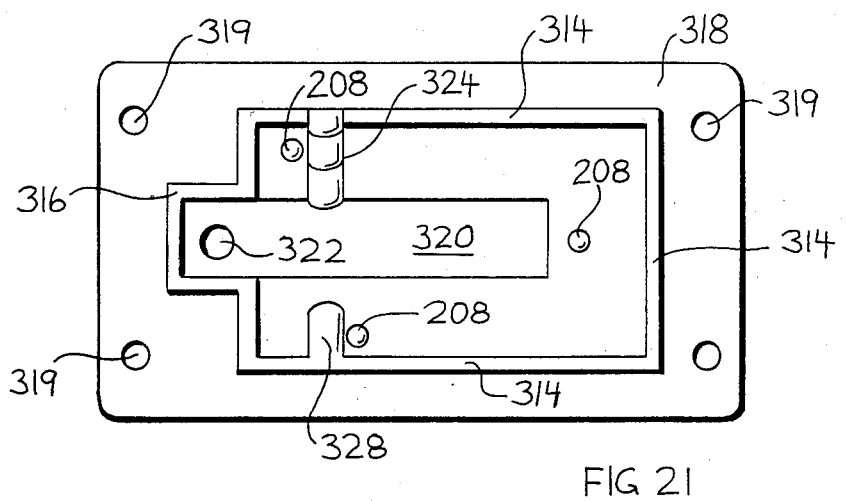
FIG 21

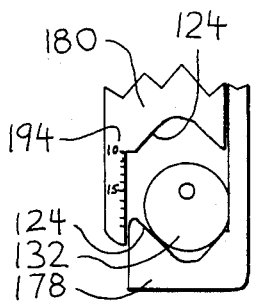
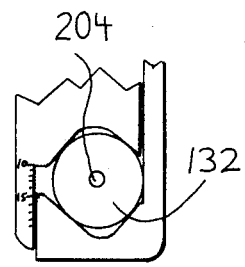
FIG 25a    FIG 25b
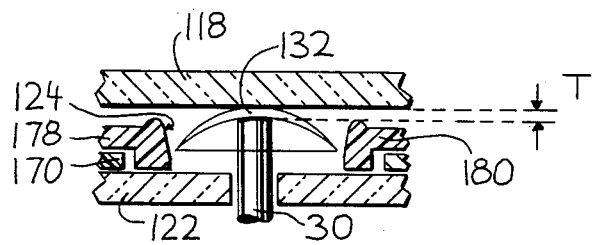
FIG 26
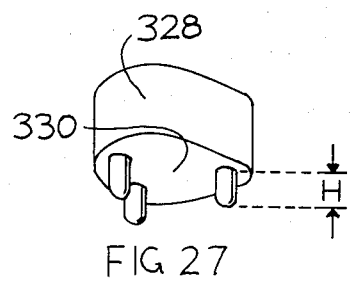
FIG 27
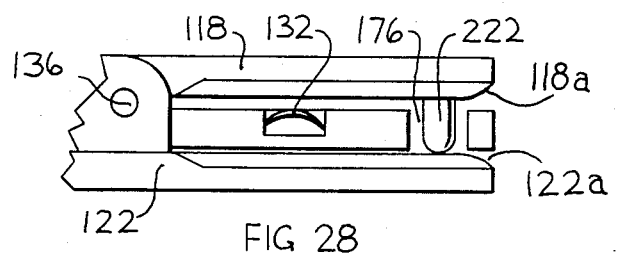
FIG 28
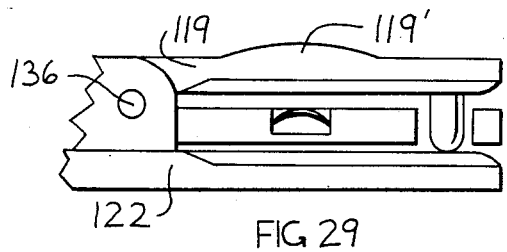
FIG 29
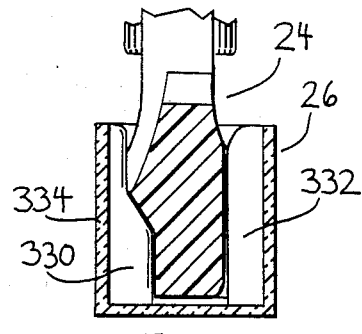
FIG 30

CONTACT LENS ANALYZING APPARATUS

BACKGROUND OF THE INVENTION

This invention relates to devices for analyzing hydrophilic contact lenses (also known as soft contact lenses) and, more particularly, to a method of measuring the sagittal depth and center thickness of a lens, as well as a device for accomplishing this. The device also permits measurement of lens diameter and inspection for defects.

With the increasing popularity of soft contact lenses, increasing numbers of manufacturers have entered the field. In addition, there is an increasing number of optometrists, opthalmologists and other practitioners involved in fitting these lenses on a patient. The large volume of lenses being manufactured has also created a large quality control problem, not only for the manufacturers but also for the individual practitioners. Each lens must be accurately dimensioned and be free of scratches, nicks and other similar defects to provide a comfortable and physiologically proper fit. This invention is directed primarily to the practitioners who actually fit lenses on their patients, although it is useful to anyone who desires to check the quality and certain key dimensions of a soft contact lens.

Lens quality is evaluated by visual inspection. Due to the nature of refractive materials, the visibility of lens surface irregularities (such as scratches or engraved codes) and lens matrix defects (such as small fractures) varies with the angle of incidence of the illuminating light. Whereas light from one particular direction might be brightly reflected or refracted toward the observer by an irregularity, a different angle of incidence might not have the same effect, so that the irregularity would be difficult or impossible to see. Moving the lens in relation to the light source enables the operator to examine the lens with several different angles of incident light. Prior art devices utilizing static projection systems hold the lens and light source in fixed positions, allowing only one angle of incident light.

One important dimension of a contact lens is its radius of curvature, which is a factor in the prescription of a contact lens. The radius of curvature can be determined by measuring the chord sagittal depth and calculating radius. Because soft lenses become aspheric when hydrated, the calculated radius is an approximation. A better method of determining curvature is to measure the full sagittal depth, or sagittal depth (or height) of the lens, sometimes also referred to as the "vault", of a lens. This is the distance between the center of the plane containing the circular bottom edge of the lens and the vertical projection of that center on the concave lens surface. In addition to central lens curvature, full sagittal depth measurements include the lens fitting influences of other lens dimensions; primarily diameter, but also optic zone size, peripheral curves, edge bevels and additional peripheral asphericty induced by lenticularization and edge configuration. Most previous lens analyzers do not directly measure the full sagittal depth but instead measure the chord sagittal depth. The device described in United Kingdom Pat. No. 1,427,030 to Highgate, for example, measures the distance between the plane of intersection of the lens support device with the concave surface of the lens, and the projection of the center of that plane on the lens surface. Since the lens is not supported on its bottom edge but is instead supported at points above the bottom edge, the resulting measurement is actually shorter than the full sagittal depth, ignoring the important peripheral lens geometry. This lessens the usefulness of the measurement. Other devices, such as those described in U.S. Pat. Nos. 4,171,576 and 4,212,107, use complex, expensive or time consuming light projection or electronic systems to measure chord sagittal depth.

Another important lens dimension essential to a proper fit and to proper physiological effect is the center thickness of the lens. Prior devices, such as the system described in U.S. Pat. No. 3,917,391 and the Model JCF analyser from Optimec Services, Ltd., require elaborate, expensive, and heat producing light projection systems coupled with a fan and heating element to maintain the hydrophilic lens and the bath in which it is kept at the proper temperature while measurements are taken. This is obviously complicated and expensive as well as difficult to operate.

To accomplish these measurements, it is necessary to carefully position the lens on a support so that an accurate reading can be obtained. Placing the delicate lens in previously designed instruments involves manipulating the lens to avoid air bubble retention and careful positioning of the lens on a pedestal. Tweezers are normally required to accomplish this, despite the admonition from several lens manufacturers to avoid their use. Soft contact lenses vary in their durability, and some are extremely susceptible to damage from tweezers. This is particularly true if the lens is dry during the measurement process, as is true with many prior art procedures. When the lens is dry, it loses some flexibility and tears more easily.

A positioning problem associated with the lens while measurements are being taken, particularly when a measuring rod or probe is to be used as in U.K. Pat. No. 1,427,118, is the centering of the lens over the probe. Unless the probe is positioned along the central radius of the lens, a true measurement of the sagittal depth and center thickness will not be obtained.

Another problem associated with devices using a probe to measure sagittal depth is the difficulty in detecting the initial lens movement occuring as the probe first touches the concave lens surface. Prior art discussions in U.S. Pat. Nos. 4,171,576 and 4,212,107 refer to the difficulty in detecting this initial movement, even with microscopes and viewers.

Still another problem associated with the use of pedestal lens supports in wet cells is the tendency of the immersed, lightweight lens to float off of the pedestal.

Accordingly, an object of this invention is to provide a method and apparatus for measuring the diameter, full sagittal depth and center thickness of a hydrophilic contact lens in its hydrated state. Another object is to provide such a method and apparatus so that the resulting measurements are more accurate than many prior art devices and yet can accomplish accurate measurements at a fraction of the cost and time previously required. A further object is to provide an apparatus which also permits detailed visual inspection of a lens using various angles of incident light. Yet another object is to manipulate the lens for immersion, bubble venting, centering, measuring, and retrieval without risk of damaging it.

SUMMARY OF THE INVENTION

In keeping with one aspect of this invention, a soft contact lens is placed concave side down within a lens chamber and them submerged in a tank of hydrating solution. The chamber has horizontally adjustable walls, a transparent movable lid, and a floor with a centrally located opening smaller than the diameter of a lens. The lens diameter can be read from a scale on the floor of the chamber and the walls of the chamber can then be spaced according to the measured diameter to center the lens over the opening. A probe remotely operable from outside the chamber is inserted through the opening in the chamber floor and moved vertically until its tip contacts the concave side of the lens. Detection of the touch of the probe to the lens is enhanced by the use of reference marks. With the zero point calibrated at the point where the tip of the probe is coplanar with the chamber floor, the sagittal depth of the lens is read from a scale associated with the probe. The probe, supporting the lens, can then be moved even further upwardly until the convex side of the lens contcts the ceiling of the chamber. This contact may be determined visually or by noting the conjunction of the lens with its reflection in the chamber lid. The center thickness is measured with a scale calibrated so that the zero point occurs when the probe contacts the chamber ceiling, and the thickness dimension increases in a downward direction.

The above-mentioned and other features of this invention and the manner of obtaining them will become more apparent, and the invention itself will be best understood by reference to the following description of the invention taken in conjunction with the accompanying drawings.

BRIEF DESCRIPTION OF THE DRAWINGS

FIG. 5a is a front view of the drain closing mechanism showing the drain in a closed position.

FIG. 5b is a front view of the drain closing mechanism showing the drain in an open position.

FIG. 5c is a front view of an alternate drain closing mechanism.

FIG. 6 is a front elevational view, partially in section, of the contact lens holder.

FIG. 7 is an enlarged, left side view of the top of the contact lens holder.

FIG. 8 is an enlarged partial front sectional view of the contact lens holder showing the pushrods, the pushrod retention projections, the lid, the centering device tabs and the tab stop.

FIG. 9 is an enlarged cross-sectional view of a portion of the contact lens chamber, showing a lens being measured for sagittal depth.

FIG. 10 is a cross sectional view of a contact lens showing the sagittal depth error induced by incorrect lens-probe alignment.

FIG. 11 is an enlarged, exploded perspective view of the contact lens centering device.

FIG. 12a is an enlarged cross sectional view of a contact lens in front of a series of fixed reference lines.

FIG. 12b is an enlarged cross sectional view of the lens of FIG. 12a showing the lens raised to a slightly higher position relative to the fixed reference lines.

FIG. 13 is a top view of the contact lens holder, partially in section along line A—A of FIG. 6.

FIG. 17a is a perspective view, partially in cross section, of a portion of the first tank according to the invention.

FIG. 17b is an enlarged, exploded perspective view of the first tank shaft anchoring elements.

FIG. 18 is a front elevational view of the contact lens holder within the first tank, a portion of which is shown in cross section.

FIG. 19 is a front elevational view of the second tank according to the invention.

FIG. 20 is a cross sectional view of the second tank taken along line C—C of FIG. 19.

FIG. 21 is a top plan view of the second tank according to the invention.

FIG. 25a is a partial top view of the adjustable centering device (with the cover removed) set at the "open" position, and showing a contact lens resting against the front chamber adjusting element walls.

FIG. 25b is a partial top view of the adjustable centering device (with the cover removed) showing the chamber walls set to the diameter of the lens, positioning the lens cocentrically with the probe opening.

FIG. 26 is an enlarged cross sectional view of a portion of the contact lens chamber showing a lens being measured for center thickness.

FIG. 27 is an enlarged perspective view of the sagittal depth calibration device.

FIG. 28 is an enlarged cross sectional schematic front view of the lower portion of the contact lens holder, showing lid and bottom plate bevels.

FIG. 29 is an enlarged cross sectional schematic front view of the lower portion of the contact lens holder, showing an alternate embodiment of a lid according to the invention.

FIG. 30 is a cross sectional view of the first tank and a portion of the contact lens holder according to the invention, taken along line D—D of FIG. 18.

DESCRIPTION OF THE INVENTION

Figure 1:
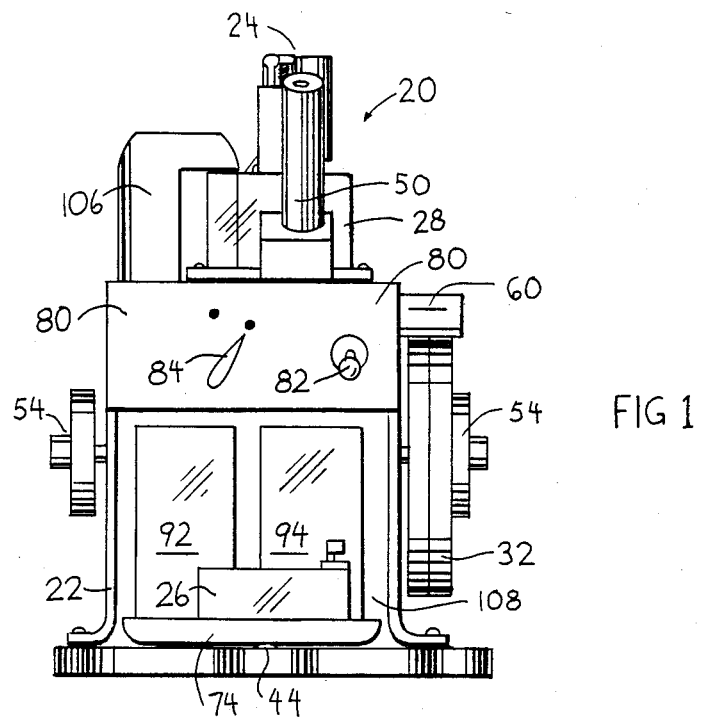
FIG. 1 is a front elevational view of the analyzing apparatus of the present invention.
Figure 2:
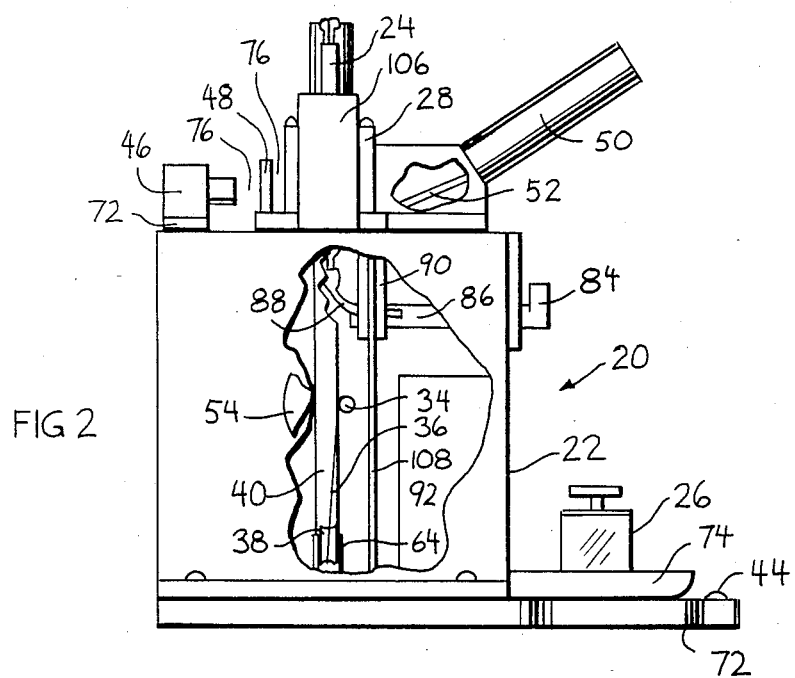
FIG. 2 is a side elevational view, partially in section, of the analyzing apparatus.
Figure 3:
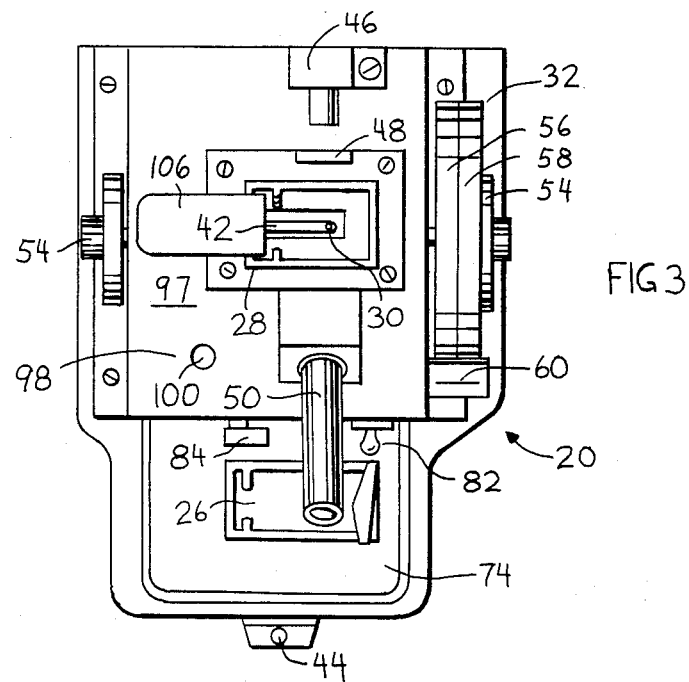
FIG. 3 is a top view of the analyzing apparatus.
Figure 4:
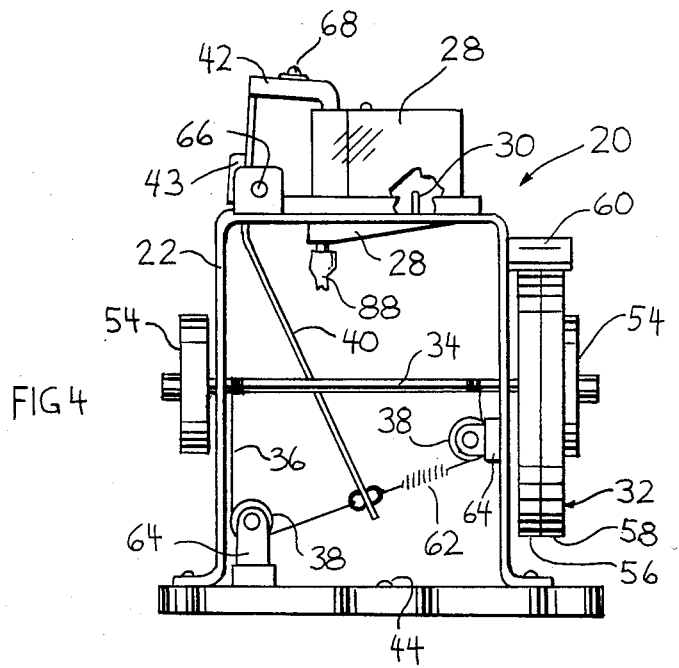
FIG. 4 is a front elevational view of the analyzing apparatus with the drip tray, drain tank, rinse tank, front plate, and partition plate removed, showing the probe control mechanism.

As shown in FIGS. 1 through 4, a soft contact lens analyzing device 20 constructed in accordance with the present invention includes a support frame or housing 22 for supporting the various components of the device 20; a contact lens holder 24; a first tank 26 and a second tank 28 to hold a hydrating solution, like saline; a probe 30 which extends through an opening in the floor of the lens holder 24; a calibrated drum 32 for indicating the position of the probe 30; a shaft 34, cord 36, pulleys 38, probe arm 40, and probe carrier 42 to link the calibrated drum 32 and the probe 30; a first tank light source 44; a second tank light source 46; a diffuser 48 to reduce the intensity of the light source 46 and diffuse it; and an inverting telescope 50 which, in combination with the inverting front surface mirror 52, enables the operator to see advantageously into the second tank 28.

Coarse/fine adjustment knobs 54 are provided for rotation of the shaft 34. The drum 32 bears two scales, a sagittal depth scale 56 and a center thickness scale 58. An indicator 60 is attached to the housing 22 for indicating a specific reading on these scales.

Rotation of the drum is translated into vertical movement of the probe through a pulley and shaft assembly. A spring 62 prevents slacks in the cord 36, and would also act as a shock absorber in the unlikely event that an undue downward force were to be put on the probe 30 or the probe carrier 42, as in the case of something falling into the second tank 28. The pulley blocks 64 are attached to the housing 22. The probe arm 40 pivots at the bearing 66, translating the oblique movement of the bottom of the probe arm into the essentially vertical movement of the probe 30. As an alternate readout means, the calibrated drum 32 could be replaced with a digital system with sensors contacting the probe arm. The probe carrier 42 is adustable secured to the probe arm 40 by a screw 68, allowing adjustments of the position of the probe 30 in the horizontal plane. The probe 30 may be integrally formed with probe carrier 42. The tip of the probe preferably has a radius of curvature generally conforming to the steeper base curves of the contact lens to be tested, so that the lens will be more stable when positioned on the probe tip. At the pivot point of the bearing 66, counterweight 42 balances the weight of the probe arm, probe carrier, and probe as influenced by the partial immersion of the probe carrier and probe in saline.

Heating of the saline solution in tanks 26 or 28 will affect lens dimensions and should be minimized. To avoid unnecessary heating, insulators 72 separate the lights 44 and 46 from the housing 22. The saline drip tray 74 acts as an insulator between the first tank light 44 and the first tank 26. Air spaces 76 on either side of the diffuser 48 further minimizes heating of the second tank. Alternately, either light could be replaced by a fiber optics system using one light as a source for both tanks, or an external light source could supply illumination through fiber optics. To further minimize heating of the instrument, a transformer could be located at the plug of the power cord, as is common practice.

Two controls are shown on the front plate 80 of the housing, the power switch 82 and the drain lever 84. The power switch has "on" and "off" positions, and supplies electrical current for the light sources. The drain lever has "open" and "closed" positions. As shown in FIG. 5a, when the drain lever is in the closed position, the integrally connected clamp bar 86 is turned so that the drain tube 88 is pressed against the clamp block 90, collapsing the tube 88. Moving the drain lever to the open position rotates the clamp bar away from the tube 88, as shown in FIG. 5b, emptying the second tank 28 into the drain tank 92 below. Alternately, a more effective seal is produced by the use of a spring 96 formed integrally with the clamp block 90, as in FIG. 5c, to insure the retention of the clamp bar 86 in a "closed" position.

A rinse tank 94 is provided for tap water rinses of the second tank. The first tank 26 is not affixed to the rest of the device, and can be brought to a sink to be rinsed. Both tanks 92 and 94 hold a greater volume of fluid than the second tank, allowing several rinses before the drain tank must be emptied. Tanks 92 and 94 rest loosely on the drop tray 74, along with the first tank 26. The drip tray can hold a sufficient volume of fluid to prevent overflowing in the event that the drain lever 84 is accidentally moved to the open position in the absence of the drain tank 92. The drip tray is easily removable to facilitate cleaning, especially the removal of salt residues from saline drippings. The top 97 of the housing is shown to be flat, but could be in the shape of a shallow depression 98 with a drain 100 at its lowest point, allowing saline drippings and spills on the top of the instrument to fall immediately into the drain tank 92 below. To protect the probe arm bearing 66 from salt accumulation, a cover 106 is provided.

Partition plate 108 encloses the probe movement mechanism, adds strength to the housing 22, and supports the clamp block 90.

FIG. 6 shows a lens holder or contact lens holder, generally referred to as 24, comprising a body or handle 110, a channel 112 formed on the front and back of the lens holder by channel sides 114 and 116, a lid 118, a centering device 120, and a bottom plate 122. The lid, the walls 124 of the centering device (best illustrated in FIG. 9), and the bottom plate form the chamber or contact lens chamber 126 in which the lens is kept while various measurements are taken. The bottom surface of the lid 118 forms the ceiling 128 of the contact lens chamber. The top surface of the bottom plate 122 forms the floor 130 of the chamber.

The contact lens 132 to be analyzed rests on the floor of the chamber. The lid 118 is transparent, allowing the lens to be observed from above. The lens can be observed from the front by looking through the vent 134 in the centering device 120.

In the preferred embodiment of the invention as shown in FIG. 6, the lid 118 and the centering device 120 are pivotally attached to the body of the lens holder 24 by a hinge rod 136 which is held by a front hinge plate 138 and back hinge plate 140. Raising the lid allows proper placement of the lens 132 on the floor 130 of the chamber 126, between the walls of the centering device. Raising both the lid and the centering device allows easy removal of the lens from the floor 130 after testing is completed. Also, with the lid and centering device raised, the chamber floor can be easily cleaned to prevent dirt or salt residues from affecting measurements. As the operator will usually be handling the delicate contact lens with the right hand while inserting it into or removing it from the contact lens holder, complete left-hand operation of the holder and lid 118 and centering device 120 is advantageous.

As seen in FIGS. 6 and 7, a mechanical linkage allows finger pressure at the top of the contact lens holder to raise the lid, or the lid and the centering device together, remotely. To raise the lid 118, finger pressure is applied to the lens insertion button 142, transmitting pressure through the lid rod or pushrod 144 to the lid tab 146, pushing the lid tab downward and pivoting the lid upward. The lens removal button 148, the centering device rod or pushrod 150, and the centering device tab 152 cooperate in like manner to pivot the centering device upward.

As the centering device pivots upward, it lifts the lid also. The centering device tab 152 will therefore be raising the combined weight of the lid and the centering device, subjecting it to more strain. In order to reduce this strain, both pushrods could be depressed simultaneously, so that the lid would be raised by its own tab 146. The preferred method of accomplishing simultaneous pushrod depression is illustrated in FIG. 7. When the lens insertion button 142 is depressed, centering device pushrod 150 does not move downward. However, when the lens removal button 148 is depressed, it engages the lid pushrod 144 at flange 147, so that both pushrods 144 and 150 move downward and both the lid 118 and the centering device 120 are raised. Another method of accomplishing simultaneous pushrod depression is to make the tops of both buttons 142 and 148 coplanar, so that simultaneous pressure against both buttons can be easily accomplished.

Returning to FIG. 6, a spring 154, positioned around spring rod 155 and beneath lens insertion button 142, raises the lens insertion button after it is released. The spring raises both buttons after the lens removal button is released in the embodiment shown in FIG. 7. When pressure on the tabs 146 and 152 is released, the lid and centering device should fall back into a horizontal position. However, if the lid and centering device were to be completely vertical when raised, they may be sufficiently balanced so as not to fall back into place readily. To prevent this vertical positioning, tab stop 156, an angled surface in the bottom plate 122, restricts the range of movement of the tabs 146 and 152, as shown in FIGS. 6 and 8.

Pushrod retention means are also shown in FIGS. 6, 8 and 13. Projection 158 on the body of the contact lens holder engages the horizontal surface 160 of the pushrods to prevent vertical dislocation of the pushrods. For initial assembly, the pushrods are inserted over the projection 158, snapping into place as the horizontal surface 160 passes over the projection. Lateral dislocation is prevented by retaining walls 161 extending perpendicularly from the pushrods toward the lid 118, as best shown in FIG. 13. Alternately, twist rods, pullrods, cords, or the like could be used instead of pushrods.

Desirably, the lid 118 has a bevelled edge 118 and the bottom plate 122 has a bevelled edge 122a, as best shown in FIG. 28, to prevent capillary attraction from sealing the chamber shut. An alternative lid 119 is shown in FIG. 29. In that embodiment, the lid 119 incorporates an integrally formed magnifier 119' centered over the lens 132 to aid in the visual inspection of the lens. Due to its shape, the magnifier also facilitates saline run-off from the lid while in the first tank, advantageously keeping the top of the lid dry.

Contact lens holder legs 206 are located below bottom plate 122 to provide the widest base for the contact lens holder 24, while avoiding the positions of the second tank supports 208 as shown in FIGS. 19 and 21. By keeping the lower surface of the bottom plate 122 away from flat smooth surfaces such as tables, the legs 206 serve two purposes. The legs prevent scratches on the lower surface of the bottom plate which would interfere with lens inspection, and they prevent foreign material from adhering to the wet bottom plate. Foreign matter between the supports 208 and the bottom plate 122 would raise the contact lens holder 24, raising the captive contact lens 132 and the contact lens chamber ceiling 128, resulting in erroneous sagittal depth and center thickness measurements.

One of the major functions of the present device is the measurement of the bull sagittal depth of soft contact lenses. FIG. 9 shows a lens 132 in the contact lens chamber 126 of the contact lens holder 24. The sagittal depth measurement is made when the probe 30 touches the center of the concave side of the lens, as viewed with the front surface mirror 52 and the telescope 50. Problems previously encountered with this method, sagittal depth measurement by probe touch, included poor lens centration over the probe and inaccurate visual detection of lens contact when touched by the probe.

The contact lens 132 must be centered over the vertically rising probe as accurately as possible. A slight horizontal error in the positioning of the lens will result in a significant error in the measured sagittal depth. Referring to FIG. 10, the lens should be measured by the probe at point A, giving the true sagittal depth measurement a. If the lens is malpositioned by y mm, so that the probe touches point B instead, the incorrect reading b will be obtained. Reading b will be s mm less than the actual sagittal depth a. According to the formula $s = r - \sqrt{r^2 - y^2}$, a malposition y of 1.0 mm will create a measuring error s of 0.06 mm for a lens of typical curvature (r=8.50 mm). By reducing the malposition y to 0.5 mm by improved lens centration, the induced error in the sagittal depth reading would be reduced to 0.015 mm, a much more tolerable margin of error.

The centering device 120 of the present invention solves the lens centration problem. FIG. 11 is an exploded perspective view of the components of the centering device 120. The top plate 162 includes the centering device hinge-barrel tops 164a, the centering device tab 152, the pivot ring post hole 166, the vent top 134a, and the reference marks 168a for measuring sagittal depth. The bottom plate 170 includes the centering device hinge-barrel bottoms 164b, the vent bottom 134b, the spring holder 172, and the pivot ring post 174 with a central lid leg hole 176. Enclosed between the top plate 162 and the bottom plate 170 are the front chamber adjusting element 178, the back chamber adjusting element 180, and the pivot ring 182. The front chamber adjusting element 178 includes chamber walls 124, a vent depression 134c, a lens rest 184, a finger tab 186, the chamber opening tab 188, a gear tooth space 190, and the chamber size index 192. The back chamber adjusting element 180 includes chamber walls 124, a finger tab 186, the chamber closing tab 189, a gear tooth space 190, the chamber size scale 194, and additional reference marks 168b. Preferably, the chamber walls 124 are slanted so that the distance between the walls at the top of the chamber is greater than the distance at the bottom of the chamber, allowing free movement of the lens as it is raised by the probe. The pivot ring 182 fits rotatably on the pivot ring post 174 and has two gear teeth 196 which mesh with the gear tooth spaces provided in each of the chamber adjusting elements 178 and 180. Spring 197 exerts a small amount of pressure on the back chamber adjusting element 180, increasing the frictional forces between the two chamber adjusting elements, thereby causing the elements to maintain their set positions. Alternately, a spring element could be formed integrally with either chamber adjusting element, or a spring element such as a washer could bear against the pivot ring.

Using a small number of gear teeth allows the use of larger gear teeth, which is advantageous because salt crystals will occasionally form on the involved parts due to evaporation of saline solution after use. The salt crystals will not jam the large gear teeth.

The chamber adjusting elements 178 and 180 are symmetrically reciprocal due to the action of the pivot ring 182, whereby laterally directed pressure on either tab 188 or 189 will cause movement in the directly affected chamber adjusting element and an equal but opposite movement in the other element, maintaining the walls equidistant from the central probe opening at all settings. The circular lens enclosed by the walls will therefore be concentric with the probe opening. The separation between these walls can also be adjusted with pressure applied to finger tabs 186. The movement of the chamber adjusting elements 178 and 180 and their integrally formed walls 124 provides a variably sized contact lens chamber when combined with the lid 118 and the bottom plate 122, as described earlier. The chamber size scale 194 and the lens diameter scale 202 can be viewed most easily through the magnifier 181 mounted at the top of the lens holder 24.

After placing the lens within the lens chamber 126 of the centering device 120, the lens chamber and lens holder 24 are desirably placed within the first tank 26 containing a soft lens hydrating solution such as saline, as shown in FIGS. 17 and 18. The lens rests on the floor 130 of the chamber, but will not adhere to the floor by suctioning effect because the probe opening 204 acts as a pressure relief vent, allowing the lens freedom of movement within the chamber. The lens holder is placed within the first tank so that the lens is fully submerged and legs 206 of the lens holder rest on the floor of first tank 26.

While in the first tank, the lens is viewed from above using the manifier 181. For proper viewing and for lens control, the chamber must be filled with saline. However, if the saline level is above the top of the lid 118, ripples on the surface of the solution obscure the view of the lens. The first tank is therefore filled to the midpoint of the thickness of the lid, allowing the top of the lid to remain dry.

As shown in FIG. 30, tank 26 has a pair of guides 330 and 332 each fixed to opposing walls 334 of the tank and located directly opposite each other. These guides mate with channels 112 on the front and back of the lens holder 24 and rigidly retain the holder in the desired position.

The first tank has a centering assembly 300 extending along one end of the tank. The assembly 300 includes a vertically extending shaft 306 which terminates at its uuper end in a handle 304 above the top of tank 26 and at its lower end in a block 310 secured to the bottom of the tank. The block 310 contains an aperture (not shown) for receiving the shaft 306. The shaft is anchored at its upper end by the interlocking anchoring elements 312 and 313 (best shown in FIG. 17b) fixed to tank 26. The anchoring elements 312, 313 form another aperture 315 through which the shaft may pass to the handle 304. Above the block near the bottom of the shaft is a U-shaped flange 302 having ends 308, 309. The flange is fixed to the shaft such that when the shaft is rotated using handle 304, the flange 302 likewise rotates. By positioning the centering device 120 so that chamber opening and closing tabs 188 and 189 are in contact with corresponding ends 308 and 309 of U-shaped flange 302, the tabs, and therefore the spacing between walls 124 of the centering device, can be manipulated using centering assembly 300. Alternately, either finger tab 186 could be engaged by a sliding or pivoting element affixed to the front or back wall of the first tank. A handle above the saline solution would operate the element.

The reference marks 168a and 168b, collectively referred to as 168, are another important feature of the present invention. Although illustrated as horizontal straight lines, they can also be in other patterns, including oblique straight lines, and concentric circles approximating the convex profile of the lenses being tested. Reference lines are advantageous because, in addition to providing a reference point from which to judge the initial movement of the lens, they also enhance the observer's ability to perceive slight lens movements. FIG. 12a shows the profile of a convex-side-up contact lens 132 in front of a series of curved lines 168 similar to, but not identical to, the contact lens profile. The curve of the lens intersects with a particular reference line L at point A. When the lens is raised slightly, as in FIG. 12b, the contact lens profile intersects the same reference line at point B. The movement along the reference line of the point of intersection from point A to point B is a significantly greater movement than the vertical movement of the contact lens, as shown by a comparison of the lens positions in FIG. 12b where the original position is shown by the dotted line. The movement of the point of intersection is visible to the eye, further enhancing the observer's ability to discern the initial movement of the contact lens. The reference lines are sufficiently close-set and long to ensure that at least one line will be essentially tangent to the lens profile in order to produce the intersection-movement effect. Alternately, the reference marks can be located in the viewing means, e.g., telescope 50, as is conventionally done with reticles. In either case, the reference lines are fixed vertically relative to the floor of the chamber. The reference marks 168 allow easy detection of lens movement and, therefore, show contact by the probe to the lens.

The relationships of the lid hinge barrels 198, the centering device hinge barrels 164, the tabs 146 and 152, and the hinge plates 138 and 140 are illustrated in FIG. 13. The hinge plates retain hinge rod 136. The tabs receive pressure from the pushrods, as described earlier, causing the hinge barrels to pivot on the hinge rod. Also, although not necessary for the practice of the invention, either or both hinge plates may be adjustably secured in order to adjust the horizontal position of the centering device 120.

The lens rest 184 comprises a flat wall surface of the front chamber adjusting element 178. As viewed from above, the lens rest 184 appears coincident with the diameter scale zero point 200. Alignment of the contact lens with the diameter scale zero point 200 is achieved by simply tilting the contact lens holder slightly to position the lens against the lens rest. Once the lens is thus positioned, the diameter can be read from the scale 202.

Also shown in FIG. 13 are the guide channels 112, the pushrod retaining projection 158, the pushrod retaining walls 161, and the probe opening 204.

Figure 16:
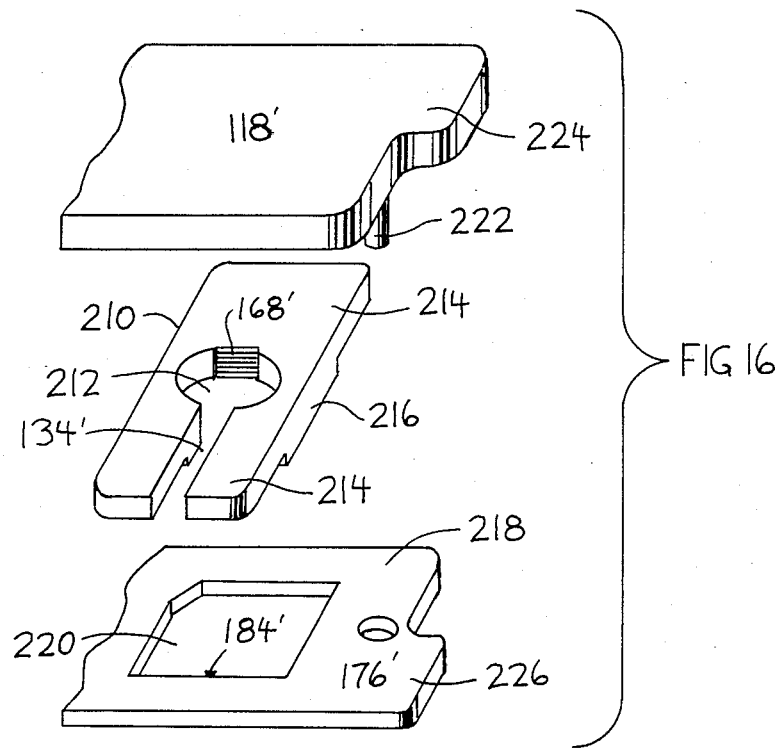
FIG. 16 is an enlarged exploded perspective view of the chamber lid and an alternate centering device.

An alternate means of centering the contact lens involves the use of a series of inserts with graduated apertures and a carrier plate, both between the lid and bottom plate of a lens chamber. The aperture sizes correspond to different contact lens diameter. FIG. 16 illustrates an insert 210 which includes a vent 134', reference lines 168′, a contact lens aperture 212, handles 214, and a lower projecting surface 216. The vent 134′ and the reference lines 168′ function as in the preferred embodiment. The lower projecting surface 216 engages with a corresponding opening 220 in the carrier 218, locking it into position. The handles 214 project beyond the carrier 218 to facilitate placement into and removal from the carrier. A lens rest 184′ is provided as in the preferred embodiment. A lid leg hole 176′ is provided in the carrier to allow passage of a leg 222 (shown in FIG. 28) extending down from the bottom of the lid 118′. The leg 222 rests directly on the bottom plate 122, minimizing the contact area between the lid 118′ and the bottom plate which might trap foreign material and result in a higher lid position.

An alternate means of raising the lid, or raising the lid and centering device, is also shown in FIG. 16. The lid 118′ includes a lip 224 which extends past the carrier 218 and the bottom plate 122. The carrier 218 has a lip 226 which is located in an opposing position to lip 224 and also extends past the bottom plate. Lifting the lid lip 224 raises the lid only, allowing insertion of the lens into the contact lens aperture 212. Lifting the carrier lip 226 raises the lid, the insert and the carrier, exposing the lens and facilitating its removal from the bottom plate 122. Raising the lid, of course, is necessary to allow insertion or removal of the sized inserts. This embodiment is simple to construct but requires removal of the lens from the contact lens holder to allow placement of the proper size insert after the lens is inspected and measured for diameter.

The sagittal depth and center thickness measurements are taken in second tank 28. The second tank 28 is shown in FIGS. 19–24. This tank is intended to be mounted on housing 22 and to receive the contact lens holder 24 after the lens diameter is measured and the lens is centered within centering device 120. Tank 28 is generally rectangular, including three walls 314 and a five-sided structure 316 forming the fourth wall of the tank. The floor 318 of the tank has a plurality of apertures 319 for securing the tank to the housing 22 and a depression 320 to allow the probe carrier 42 and probe 30 to extend below the bottom plate 122 of the lens holder 24. Three second tank supports 208 protrude above the tank floor 318 to position the lens holder at a specific height relative to the probe. The contact area between the supports and the bottom plate is small, minimizing the possibility of the lens holder being raised by trapped foreign matter. Drain 322 in the bottom of depression 320 allows hydrating solution in the tank to be removed through tube 88, as discussed previously.

Tank 28 also has a pair of guides 324, 325 each fixed to opposing walls 314 of the tank and spaced equidistantly from the five-sided structure 316. These guides mate with guide channels 112 on the front and back of the lens holder and rigidly position the lens holder in the desired horizontal position, relative to the probe, within tank 28.

Figures 22, 23:
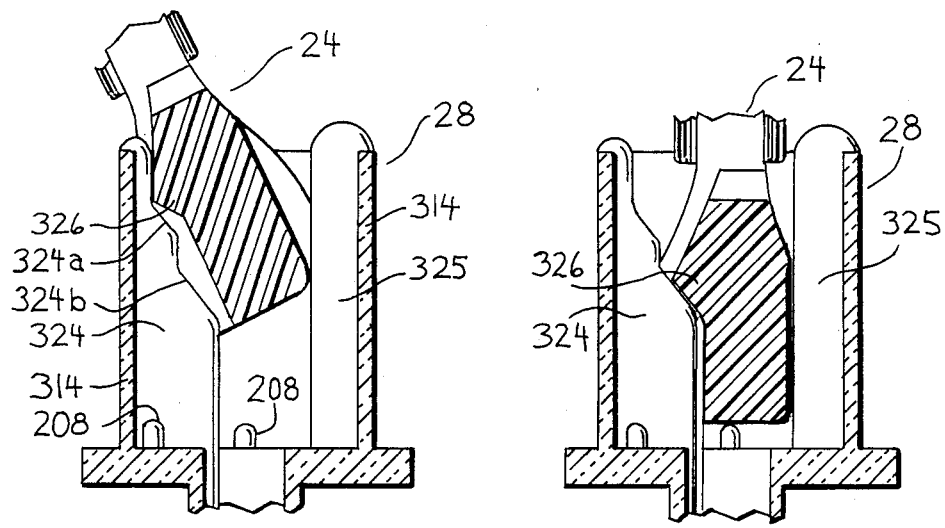
FIG. 22 is a cross sectional view of the second tank showing the bottom portion of the contact lens holder tilted within the second tank.
FIG. 23 is a cross sectional view of the second tank and of the contact lens holder taken along line B—B of FIG. 6 resting within the second tank.
Figure 24:
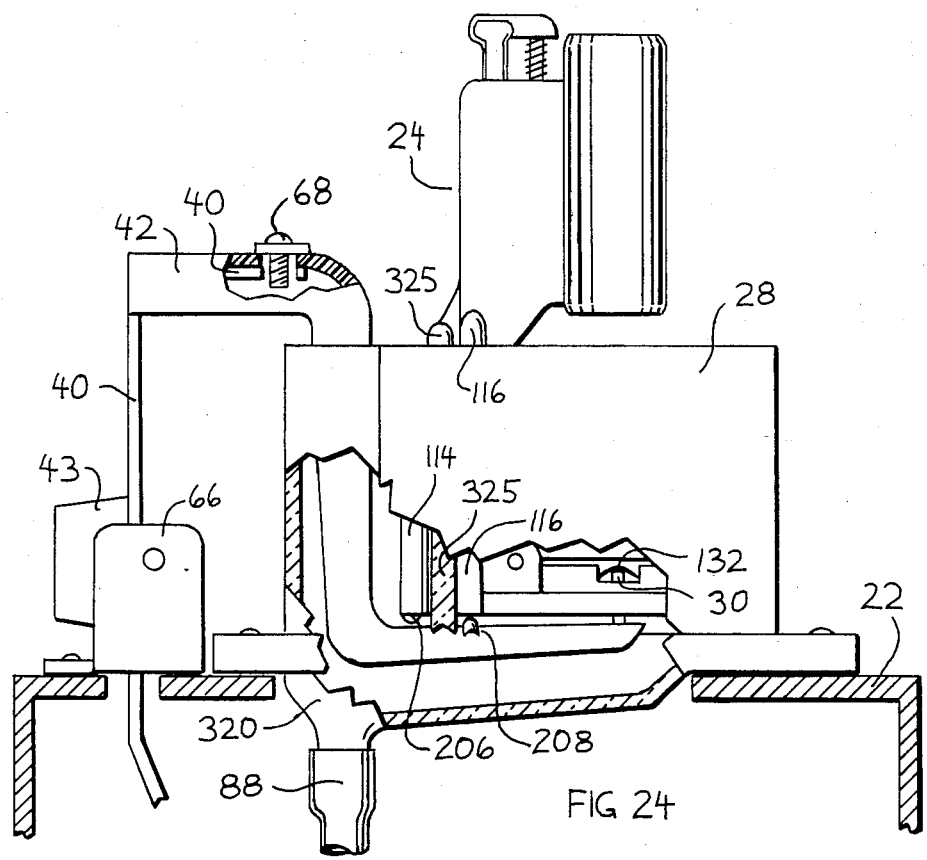
FIG. 24 is a front elevational view, partially in cross section, of the contact lens holder, the second tank, and a portion of the probe assembly mounted on the housing.

Insertion of the lens holder 24 into the second tank is best shown in FIGS. 22 and 23. The guides are positioned within channels 112 on the front and back of the lens holder. Guide 324 is stepped; that is, it has an upper plateau surface 324a and a lower plateau surface 324b upon which a catch 326 located within one of the channels 112 can rest. By inserting the lens holder in a tipped-back position with catch 326 resting on the upper plateau 324a, the lens holder is tilted and any air bubbles trapped within the lens chamber or under the lens can be released. By sliding the catch from the upper plateau and lowering the contact lens holder onto the supports 208, the lens holder is securely positioned horizontally and vertically within the second tank for analyzing the lens.

While the first and second tanks 26 and 28 have been described separately, a single tank combining the features of both could be used instead.

USE OF THE APPARATUS

In use, the instrument is first prepared by filling the first and second tanks 26 and 28 to the proper levels with an appropriate solution, preferably normal saline solution as is customarily used with soft contact lenses. The power switch is turned on to provide illumination for the lens testing procedures. The contact lens holder 24 is held by the handle 110, and access to the contact lens chamber is obtained by pressing on the lens insertion button 142, which raises the lid 118. The size of the chamber is adjusted to its largest setting by pressing on the chamber opening tab 188. The contact lens is then placed concave side down on the floor 130 of the chamber, between the walls 124 of the centering device 120. The lens insertion button 142 is released, allowing the lid 118 to drop down and close the chamber.

Figure 14:
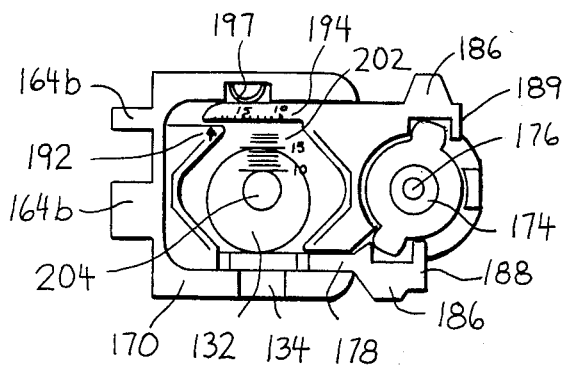
FIG. 14 is a top view of the adjustable centering device (with the cover removed) set at the "open" position, and showing a contact lens in position for diameter measurement.

The operator places the contact lens holder in the first tank 26 and tips the tank back to allow any bubbles trapped under the contact lens to escape through the vent 134. The tank is then held several inches above the lens inspection light source 44 and tipped slightly toward the operator to enable him to look down into the magnifier 181. Tipping the tank causes the lens to slide to the lens rest 184 as shown in FIG. 14, positioning the lens for a subsequent diameter measurement.

The contact lens can be seen from above and visually inspected for cracks, chips, adherent particles, discoloration, coatings, or other defects. Moving the tank in front of the light source 44 enhances the operator's ability to see lens surface irregularities and matrix defects, as previously discussed. Lens markings, if any, are noted and verified or recorded as necessary.

As the lens has already been positioned on the lens rest 184 and zero mark 200, the lens diameter can now be conveniently read from the diameter scale 202 on the bottom plate 122, or alternatively on a reticle printed on the tank floor or in the magnifier. If desired, other linear dimensions, such as lenticular zone size, lens height at truncation, truncation width, lens diameter in other meridians, bifocal height, chamfer width, size of tinted areas, etc., can be easily measured by holding a ruler (preferably a clear ruler) against the bottom of the tank. From above, the lens appears superimposed on the ruler. By using the built-in lens stop and diameter scale, the diameter measurement can be made rapidly because no additional positioning of parts is necessary.

Figure 15:
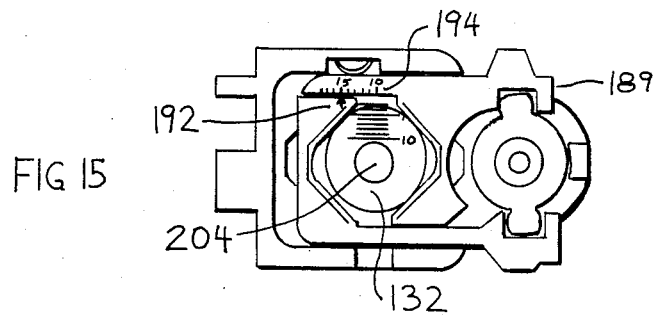
FIG. 15 is a top view of the adjustable centering device (with the cover removed) showing the chamber walls set to the diameter of the lens, positioning the lens concentrically with the probe opening.

Once the diameter has been measured, the diagonal size of the contact lens chamber is set by simply turning the handle 304 of the first tank 26 until the chamber size scale 194 corresponds to the measured diameter. The lens is now restricted to a centered position by the contact lens chamber walls 124, concentric with the probe opening 204, as shown in FIG. 15.

Alternatively, the lens diameter measurement and the centering of the lens can be accomplished simultaneously by turning the first tank and lens holder so that the lens 132 rests against the walls 124 of the front chamber adjusting element 178, as shown in FIG. 25a. The operator brings the walls together until the lens just touches the walls of the back chamber adjusting element 180. The lens is then concentric with the probe opening 204, and the diameter of the lens is indicated on scale 194, as shown in FIG. 25b.

The contact lens holder is then moved to the second tank. The holder, guided by the tank guides 324, 325, is lowered in a tipped-back position to vent any bubbles trapped under the contact lens. As the holder is lowered further onto the guides, it becomes vertical, coming to rest at a specific height on the three tank supports 208. The supports are of greater vertical dimension than the contact lens holder legs 206. Positioned by the tank guides, the concentric probe opening and contact lens now share a common axis with the probe 30.

The lens and reference lines 168a and 168b on the centering device 120 are viewed with the front surface mirror 52 and the telescope 50. As the mirror inverts the image, the telescope has optics selected to re-invert the image, so that the operator sees an erect image. The image is reversed right-to-left, but this does not affect the function of the invention. The operator raises the probe until the lens is seen to move, which establishes the sagittal depth "S", as shown in FIG. 9. The sagittal depth reading is noted and the probe, shaped similarly to the steeper lenses to be measured to improve lens stability, is raised further until the lens is seen to touch the contact lens chamber ceiling, establishing the center thickness. Contact between the convex surface of the lens and the ceiling of the chamber can be easily determined by observing when the reflection of the lens as viewed in the reflective surface of the ceiling appears to touch the actual lens. The center thickness reading "T" (shown in FIG. 26) is then noted and the contact lens holder is removed from the tank, tipping it slightly as it is raised to drain off excess saline. The lens removal button is depressed and the exposed lens is manually removed from the floor of the holder.

An alternate method of measuring the sagittal depth of very thin lenses involves light reflected from the front surface of the lens. Using a light source behind and slightly above the lens, the operator sees a reflection over the thin center of the lens. As the probe begins to touch the concave surface of the lens, the convex surface distorts, causing a visible change in its reflection.

An alternate method of measuring the sagittal depth of very thick lenses involves light reflections within the lens itself. The convex and concave surfaces of the lens act as a light guide, channeling light by total internal reflection in the same manner as is known in the art of optics. With light coming from behind the lens, the operator sees a bright band of light in the profile of the lens. As the probe begins to touch the concave surface of the lens, it indents the lens slightly. The slight change of curvature is adequate to disrupt the internal reflection at that point. The operator then sees a dark spot within the bright band, indicating probe touch.

An alternate method of measuring center thickness is to raise the lens until the lens begins to raise the lid of the contact lens holder. Movement of the lid would then indicate the initial touch of the lens to the ceiling.

After the center thickness measurement is completed, the lens holder is removed from the second tank. The operator depresses the lens removal button 148 to raise both the lid and centering device, exposing the lens for removal.

Calibration of the sagittal depth scale is easily accomplished with a standard 328 of known height "H", shown in FIG. 27. The standard is placed on the floor of the contact lens chamber. The probe is raised in the usual manner, and when the probe tip appears to touch its own reflection in the reflective underside surface 330, the sagittal depth scale reading is noted. If the reading does not agree with the known height "H" of surface 330, the scale is then adjusted to agree with the standard.

Calibration of the center thickness scale is accomplished in a similar manner. The empty contact lens holder is placed in the second tank. The probe is raised until it touches its own reflection in the ceiling 128. If the instrument is properly calibrated, the center thickness scale should read "0.00". If the scale reads otherwise, it should be adjusted.

It can be readily appreciated that the actual use of the instrument is fast and uncomplicated, especially considering that four analysis functions are accomplished: lens inspection, horizontal lens measurement (diameter, etc.), sagittal depth measurement, and center thickness measurement.

While the principles of the invention have been described in connection with specific apparatus and applications, this description is made only by way of example and not as a limitation on the scope of the invention.

I claim:

1. An apparatus for analyzing a soft contact lens by allowing inspection of said lens and measurement of its diameter, sagittal depth, and center thickness, comprising:

a contact lens holder including a lens chamber delineated by a ceiling which is the lower surface of a transparent lid, walls which can be adjustably separated, and a floor with a centrally located probe opening;

means for accessing the interior of said chamber to insert or remove the lens therein;

a first tank in which to immerse said contact lens chamber in appropriate solution, such as saline, to maintain hydration of said lens during inspection and diameter measurement;

a vent in said lens chamber to permit the escape of air bubbles;

means for measuring linear lens dimensions, such as lens diameter;

a lens centering device for laterally positioning said chamber walls to center the lens over said probe opening;

a second tank in which to immerse the contact lens chamber in solution, to maintain hydration of the lens during sagittal depth and center thickness measurements;

a vertically movable probe extending through the probe opening for contacting the centered lens and moving it from the floor to the ceiling of the lens chamber; and a scale associated with said probe for determining its height relative to the floor and ceiling of said chamber, thereby measuring the sagittal depth and center thickness of the lens.

2. The apparatus of claim 1 wherein said contact lens chamber accessing means comprises pivotal attachment of said lid to said holder, whereby pivoting the lid upward allows insertion of the lens into the chamber.

3. The apparatus of claim 1 wherein said contact lens chamber accessing means comprises pivotal attachment of said lid and said lens centering device to said holder, whereby pivoting the lid and centering device upward exposes the lens, facilitating its removal from the floor of the chamber.

4. The apparatus of claim 2 or 3 including mechanical means for remotely raising said pivoting elements.

5. The apparatus of claim 2 or 3 wherein said lid and said centering device are provided with opposingly positioned lips, whereby lifting the lid lip raises the lid and lifting the centering device lip raises both the lid and the centering device.

6. The apparatus of claim 1 wherein said adjustably separable walls of said lens centering device are symmetrically reciprocating so that each of said walls can be positioned to tangentially contact any diameter lens and retain it concentrically over said probe opening.

7. The apparatus of claim 6 including a spring bearing against at least one of said movable walls to help maintain the positions of said walls once they are set.

8. The apparatus of claim 6 including a scale to indicate the diameter of a lens tangentially contacted by said walls.

9. The apparatus of claim 6 including extensions of said walls and means of applying pressure to said extensions to change the separation between said walls.

10. The apparatus of claim 6 wherein said lens centering device includes a pivoting element connecting said adjustably separable walls, whereby said walls can slide laterally and thereby vary the separation between them symmetrically.

11. The apparatus of claim 10 including a spring bearing against said pivoting element to help maintain the positions of said walls once they are set.

12. The apparatus of claim 9 wherein said means of applying pressure comprises direct manual pressure by the operator.

13. The apparatus of claim 9 wherein said means of applying pressure comprises a movable member in said first tank which engages said wall extensions, and a handle connected to said movable member, said handle extending above said solution.

14. The apparatus of claim 13 wherein said movable member comprises a pivoting flange fixed to a shaft which is rotatably secured to said first tank.

15. The apparatus of claim 1 wherein said first tank includes guides which engage said contact lens holder to properly position it within said tank.

16. The apparatus of claim 1 wherein said lens centering device comprises a series of inserts having apertures of various sizes corresponding to diameters of contact lenses, whereby the desired insert is positioned between said lens chamber lid and floor so that the lens contained within said aperture is positioned concentrically over said probe opening.

17. The apparatus of claim 1 wherein said lens holder includes a handle extending above said hydrating solution for ease of handling said lens holder.

18. The apparatus of claim 1 including a magnifier for inspecting said lens and for viewing said lens and said measurement means.

19. The apparatus of claim 1 wherein said lens measuring means comprises a lens rest integral with said lens centering device and a scale visible simultaneously with said lens and fixed relative to said lens rest.

20. The apparatus of claim 8 wherein said lens measuring means comprises reducing the distance between said adjustably separable walls so that said contact lens is tangentially contacted by said walls at three or more points, thereby indicating the diameter of the lens on said lens diameter scale.

21. The apparatus of claim 1 including reference marks visible simultaneously with said lens and fixed vertically relative to the floor of said lens chamber to facilitate visual recognition of initial vertical lens movement.

22. The apparatus of claim 1 including an element with a reflective lower surface held at a known height above said floor by multiple supports, whereby said probe and its reflection appear to touch each other as the probe tip becomes coincident with said reflective surface, thereby enabling comparison of the known height of the reflective surface with the probe height as indicated by the probe scale.

23. The apparatus of claim 1 including guides fixed to said second tank for slidable engagement with said lens holder to position the lens chamber properly within said tank.

24. The apparatus of claim 23 wherein one of said guides is stepped to provide a plateau for tilting and resting said lens chamber to vent air bubbles.

25. The apparatus of claim 1 including a plurality of supports within said second tank to maintain said lens chamber in a fixed position above the floor of said tank, thereby maintaining the lens chamber at a proper height relative to said probe.

26. The apparatus of claim 1 wherein said chamber lid reflects light from its interior surface so that the reflection of an object, such as the probe or the contact lens, is visible as the object approaches said reflective lid.

27. The apparatus of claim 26 wherein said center thickness measuring means comprises raising said contact lens by said probe so that the lens and its reflection appear to touch each other as the convex surface of the lens becomes coincident with the reflective surface of the ceiling, whereby the distance between the measured height of the probe and the known height of the ceiling indicates said center thickness.

28. The apparatus of claim 2 wherein said center thickness measuring means comprises raising said contact lens by said probe so that the lens contacts said chamber ceiling and begins to lift it, indicating touch of the convex surface of the lens to the ceiling, whereby the distance between the measured height of the probe and the known height of the ceiling indicates said center thickness.

29. The apparatus of claim 27 or 28 wherein the tip of said probe has a radius of curvature conforming generally to the steeper curvatures of the contact lenses to be analyzed, so that the lens will be more stable when raised by the probe.

30. The apparatus of claim 1 including an extension of said lid which rests directly on said floor without contacting the interposed centration device, thereby reducing the number of contact points between floor and ceiling which might accumulate foreign matter and raise said ceiling, resulting in erroneous center thickness measurements.

31. The apparatus of claim 1 including a rotatable drum bearing said scale associated with said probe, and a linkage between said drum and probe, whereby rotation of the drum causes vertical movement of the probe.

32. The apparatus of claim 1 including a drain in said second tank and means for opening and closing said drain.

33. The apparatus of claim 32 wherein said drain opening and closing means includes a flexible tube connected to said drain and a clamp bar for collapsing and releasing said tube.

34. A chamber for holding a soft contact lens while submerged in hydrating solution, including a floor which is transparent at least to a point beyond the periphery of said contact lens, said floor having at least one pressure relief vent, thereby allowing inspection and analysis of said contact lens in the hydrated state while preventing adhesion of the lens to the floor by pressure differential and lens distortion therefrom.

35. The apparatus of claim 34 including a diameter scale and a lens rest coincident with the zero point of said scale.

36. An apparatus for measuring the full sagittal depth of a soft contact lens, comprising a distance measuring means; a detachable chamber for holding said soft contact lens, said chamber including a floor; and means for supporting said chamber in a fixed position relative to said measuring means; whereby the chamber is easily placeable on and removable from said supporting means, so that said contact lens rests on said floor, and so that the floor of said chamber is at a known position in relation to said measuring means, thereby allowing fast and accurate positioning of the lens in relation to the measuring means, enabling measurement of the perpendicular distance from the plane of said chamber floor to the center of the back surface of said lens.

37. The apparatus of claim 36 wherein said detachable chamber includes chamber walls which can be laterally positioned, means for remotely moving said walls while said walls are submerged in solution, said remote moving means extending above solution, and means for observing said contact lens and said walls, thereby enabling said walls and lens to be remotely positioned while being observed.

38. An apparatus for measuring the full sagittal depth of a soft contact lens as measured from the plane of the back edge of said lens perpendicularly to the center of the back surface of said lens, comprising:
  a lens chamber including walls which can be adjustably separated and a floor with a centrally located opening;
  means for maintaining hydration of said lens while it is positioned in said lens chamber;
  means for positioning said chamber walls laterally to center the lens over said opening;
  means extending through the opening for contacting the centered lens; and
  a scale associated with said lens contacting means for determining its height relative to the floor of said chamber, thereby measuring the full sagittal depth of the lens.

39. An apparatus for measuring the ceter thickness of a soft contact lens, comprising:
  a lens chamber including a ceiling which is at a known height, walls which can be adjustably separated, and a floor with a centrally located opening;
  means for maintaining hydration of said lens while it is positioned in said lens chamber;
  means for remotely positioning said chamber walls laterally to center the lens over said opening;
  means extending through said opening for raising the centered lens from the floor of the chamber to a position where the convex surface of the lens is in contact with said ceiling; and
  a scale associated with said lens raising means for determining its height relative to the ceiling of said chamber, whereby the distance between said lens raising means and said ceiling is known, with the zero point in height being set when the lens raising means is coplanar with the ceiling, thereby measuring the center thickness of the lens.

40. A method of measuring the sagittal depth of a soft contact lens, comprising the steps of:
  (a) placing the contact lens into a chamber having an opening in the floor so that the concave side of the lens faces the floor;
  (b) immersing the contact lens chamber in appropriate solution, such as saline, in a first tank;
  (c) venting the air bubble, if any, trapped beneath said lens;
  (d) adjusting the horizontal dimension of said chamber according to the diameter of the lens so that the lens is centered over said opening;
  (e) immersing the contact lens chamber in appropriate solution in a second tank;
  (f) venting the air bubble, if any, trapped beneath said lens;
  (g) moving a probe through said opening until it touches the center of the concave side of the lens; and
  (h) measuring the height of the probe above the plane of the floor, whereby said height indicates the sagittal depth of the lens.

41. The method of claim 40 including a chamber lid, wherein said first tank is filled with solution to a level whereby the top of the lid is above the solution and dry, and the bottom of the lid is immersed in solution, thereby preventing the formation of surface ripples and facilitating viewing of the lens and the measurement means.

42. The method of claim 40 which is particularly suitable for thin lenses wherein step (g) includes the additional step of positioning a light behind and above the lens so that a reflection can be observed over the center of the lens, and determining the point of contact between the probe tip and the concave side of the lens by observing a distortion in the reflection of the light.

43. The method of claim 40 which is particularly suitable for thick lenses wherein step (g) includes the additional step of positioning a light behind the lens so that a relection appears as a bright band in the profile of the lens, and determining the point of contact between the probe tip and the concave side of the lens by observing a dark spot within the bright band.

44. A method of measuring the center thickenss of a soft contact lens, comprising the steps of:
  (a) placing the contact lens into a chamber having an opening in the floor so that the concave side of the lens faces the floor;
  (b) immersing the contact lens chamber in appropriate solution, such as saline, in a first tank;
  (c) venting the air bubble, if any, trapped beneath said lens;
  (d) adjusting the horizontal dimension of said chamber according to the diameter of the lens so that the lens is centered over said opening;
  (e) immersing the contact lens chamber in appropriate solution in a second tank;
  (f) venting the air bubble, if any, trapped beneath said lens;
  (g) lifting the lens with a probe extending through said opening until the convex side of the lens touches the ceiling of the chamber; and
  (h) measuring the distance from the probe to the ceiling, whereby said distance indicates the center thickness of the lens.

45. The method of claim 44 wherein the chamber has a light reflective ceiling and wherein contact between the convex side of the lens and the ceiling of the chamber referred to in step (g) is determined by observing when the reflection of the lens as viewed in the ceiling appears to touch the actual lens.

46. The method of claim 44 further comprising the step of raising the probe, without a contact lens, until the probe touches the chamber ceiling, whereby an indicated measurement of "zero" demonstrates correct probe height calibration.

47. A method for measuring the full sagittal depth of a soft contact lens perpendicularly from the plane that the back edge of said lens rests on to the center of the back surface of said lens, comprising:
    (a) hydrating the lens within a chamber having a floor, said floor having a centrally located opening;
    (b) centering the lens over said opening so that the concave side of the lens faces the opening;
    (c) moving a probe through said opening until its tip contacts the concave side of the lens; and
    (d) measuring the vertical distance that said probe moved from the plane of the floor, which is in contact with the back edge of said contact lens, to the point of contact with the center of the back surface of said lens, with the zero point in distance being set when the tip of the probe is coplanar with the floor of the lens chamber, thereby measuring the full sagittal depth of the lens.

48. A method for measuring the center thickness of a soft contact lens, comprising:
    (a) hydrating the lens within a chamber having a ceiling and a floor, said floor having a centrally located opening;
    (b) centering the lens over said opening so that the concave side of the lens faces the opening;
    (c) lifting the lens with a probe extending through said opening and in contact with the concave side of the lens until the convex side of the lens contacts the ceiling of the chamber; and
    (d) measuring the distance from the chamber ceiling to the top of the probe at the point of contact of the lens with the chamber ceiling, with the zero point in height being set when the tip of the probe is coplanar with the chamber ceiling.

* * * * *